J. Blackmar.
Heddle.
No. 61. Patented Oct. 20, 1836.
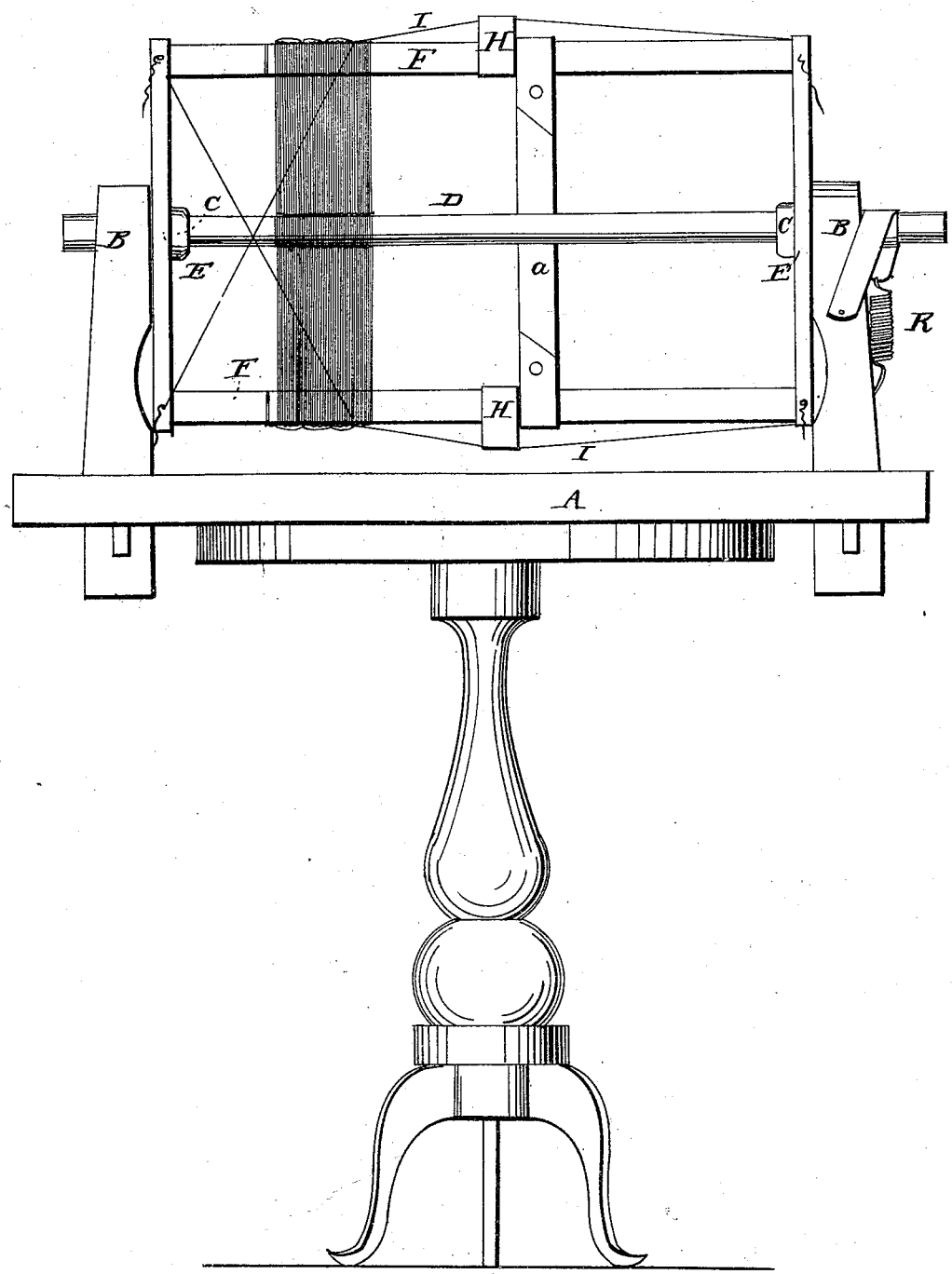

UNITED STATES PATENT OFFICE.

JOHN BLACKMAR, OF BROOKLYN, CONNECTICUT.

MACHINE FOR MAKING WEAVERS' HARNESS.

Specification of Letters Patent No. 61, dated October 20, 1836.

*To all whom it may concern:*

Be it known that I, JOHN BLACKMAR, of Brooklyn, in the county of Windham and State of Connecticut, have invented a new and useful Improvement in Machines or Benches Used for Making and Constructing Weavers' Harnesses; and the following is a full and exact description of the same.

The machine, or bench may be constructed in all essential respects like the machine or bench now in use for making heddles or harnesses for weaving, excepting the application of that principle which makes a part of said machine or bench susceptible of a rotary or revolving motion. This motion is thus obtained, as will appear from this description, and reference to the accompanying drawing. Let (A.) represent the bottom of the machine or bench which may rest on four legs, or otherwise; near the top of each of the studs or posts standing near each end of bottom of the bench (B.) let a hollow arbor or gudgeon (C.) be inserted; and into each of these gudgeons, let the rod (D.) be received. Thus the rod resting in the gudgeons, and the gudgeons passing through the arms (E.), and the arms made fast to the gudgeons, and they resting in the studs, will form an axle, which on the application of a slight force, at the pleasure of the operator will revolve carrying with it in its revolution the arms and the shafts F, on which the harness is constructed.

G represents a brace to hold or secure the rod, and the shafts in their appropriate places; and to keep them from sagging.

H represents slides, or thumb pieces to raise the binding twine (I.) from the shafts K, a spiral spring to hold the shafts in the position desired.

What I claim as my invention, and desire to secure by Letters Patent, is—

The revolving principle above specified, and described, whether the said revolving motion be obtained as above described, or in any other way, or manner.

JOHN BLACKMAR.

Witnesses:
THOMAS BACKUS,
DANIEL P. TYLER.